(12) United States Patent
DiFoggio (10) Patent No.: US 10,288,463 B2
(45) Date of Patent: May 14, 2019

(54) MULTIPHASE THERMAL FLOWMETER FOR STRATIFIED FLOW

(71) Applicant: Baker Hughes Incorporated, Houston, TX (US)

(72) Inventor: Rocco DiFoggio, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 304 days.

(21) Appl. No.: 14/751,909

(22) Filed: Jun. 26, 2015

(65) Prior Publication Data
US 2016/0376888 A1    Dec. 29, 2016

(51) Int. Cl.
*G01F 1/68* (2006.01)
*E21B 47/10* (2012.01)

(52) U.S. Cl.
CPC ............ *G01F 1/68* (2013.01); *E21B 47/1005* (2013.01)

(58) Field of Classification Search
CPC ..................................................... E31B 49/087
USPC ...................................................... 73/152.18
See application file for complete search history.

(56) References Cited

U.S. PATENT DOCUMENTS

| | | | |
|---|---|---|---|
| 5,610,331 A * | 3/1997 | Georgi | E21B 47/065 166/250.01 |
| 5,661,248 A | 8/1997 | Bernicot et al. | |
| 5,708,211 A | 1/1998 | Jepson et al. | |
| 5,736,637 A | 4/1998 | Evans et al. | |
| 5,929,342 A | 7/1999 | Thompson | |
| 7,240,730 B2 | 7/2007 | Williams et al. | |
| 7,424,366 B2 | 9/2008 | Angelescu et al. | |
| 7,475,724 B2 | 1/2009 | Pribnow et al. | |

(Continued)

FOREIGN PATENT DOCUMENTS

| | | |
|---|---|---|
| CN | 101539016 A | 9/2009 |
| CN | 101539016 B | 11/2014 |

(Continued)

OTHER PUBLICATIONS

Sep. 12, 2016 International Search Report and Written Opinion of corresponding International application PCT/US2016/038658.

*Primary Examiner* — Walter L Lindsay, Jr.
*Assistant Examiner* — Philip Marcus T Fadul
(74) *Attorney, Agent, or Firm* — Bracewell LLP; Keith R. Derrington (57) ABSTRACT

A method and system for evaluating both fluid type and fluid flow downhole by applying thermal energy in a flow of the fluid, and monitoring downstream temperature over time to generate a temperature profile. The type of fluid being evaluated can be determined by comparing the measured temperature profile to profiles over time of known fluids because these profiles depend upon these fluids' thermal diffusivities and flow rates. Further, stratified flow in a deviated wellbore can be analyzed by conducting the fluid evaluation at different radial locations in the flow stream so that the presence of water, liquid hydrocarbons, and gas can be identified. The system can include a pivoting arm that selectively spans the wellbore diameter, and which includes multiple thermal sources, each with corresponding thermal sensor, that are spaced along the arm. A frame can be provided for each of the sources and sensors, which is automatically self-oriented along the direction of fluid flow like a weather vane.

19 Claims, 6 Drawing Sheets

(56) References Cited

U.S. PATENT DOCUMENTS

| | | |
|---|---|---|
| 8,360,635 B2 | 1/2013 | Huang et al. |
| 8,770,835 B2 | 7/2014 | Sroka et al. |
| 2002/0016701 A1 | 2/2002 | Duret et al. |
| 2003/0230150 A1 | 12/2003 | Drahm et al. |
| 2004/0168522 A1 | 9/2004 | Fernald et al. |
| 2004/0168523 A1 | 9/2004 | Fernald et al. |
| 2005/0103980 A1 | 5/2005 | Schultz et al. |
| 2008/0066534 A1* | 3/2008 | Reid ................. E21B 49/06 73/152.11 |
| 2011/0301877 A1 | 12/2011 | Wee et al. |
| 2012/0084021 A1 | 4/2012 | Jones et al. |
| 2013/0000398 A1 | 1/2013 | DiFoggio |
| 2015/0020580 A1 | 1/2015 | Hoffman et al. |

FOREIGN PATENT DOCUMENTS

| | | | |
|---|---|---|---|
| WO | WO 2010142999 A2 * | 12/2010 | ........... G01F 1/6847 |
| WO | WO 2013026467 A1 | 2/2013 | |
| WO | WO2013076479 A1 | 5/2013 | |

* cited by examiner

Fig. 8

MULTIPHASE THERMAL FLOWMETER FOR STRATIFIED FLOW

BACKGROUND

1. Field of Invention

The invention relates generally to a system and method for evaluating a multiphase flow of wellbore fluids in a tubular. More specifically, the system and method introduces thermal energy into the flow and monitors downstream heating of the fluid to estimate both fluid phase and flow velocity.

2. Description of Related Art

Flowmeters are often used for measuring flow of fluid produced from hydrocarbon producing wellbores. Flowmeters may be deployed downhole within a producing wellbore, a jumper or caisson used in conjunction with a subsea wellbore, or a production transmission line used in distributing the produced fluids. Monitoring fluid produced from a wellbore is useful in wellbore evaluation and to project production life of a well. The produced fluid may include water and/or gas mixed with liquid hydrocarbon. Knowing the water fraction is desirable to ensure adequate means are available for separating the water from the produced fluid. Additionally, the amount and presence of gas is another indicator of wellbore performance, and vapor mass flow impacts transmission requirements. In wells having a network of wellbores. It is useful to estimate which bores produce different types of fluid.

Flowmeters can be employed that provide information regarding total flow, water cut amount and gas fractions. However, these often require periodic analysis of the fluid entering the flowmeter. This may involve deploying a sample probe upstream of the flowmeter, which can produce inaccuracy, and may interrupt or temporarily halt fluid production. The types of flowmeters range from pressure differential, spinner type meters, thermal poise, and capacitive sensors.

SUMMARY OF THE INVENTION

The present disclosure includes a method and apparatus for evaluating flow of a fluid downhole. An example of a method for evaluation downhole fluid flow includes applying thermal energy to the flow of fluid at a position in the flow of fluid, sensing a temperature of the fluid stream downstream of the position over time, and estimating a type of fluid in the flow of fluid based on the step of sensing temperature downstream. The method can further include generating a temperature profile based on the step of sensing a temperature. The steps of applying thermal energy to the flow of fluid can be performed at different radial positions in the flow of fluid, and temperatures downstream of the different radial positions can be sensed, this example can further include generating a temperature profile of fluid alter application of thermal energy at each of the different radial positions, and identifying different phases of fluid within the flow of fluid at the different radial positions based on the step of generating the temperature profiles. The different phases of fluid can be water, liquid hydrocarbon, and gas. In an example, the thermal energy is applied upstream and spaced axially away from where the temperature is sensed at each radial position. The method can further include estimating a flow rate of the flow of fluid based on an elapsed time between when the thermal energy is applied and when a peak temperature is measured downstream. In an example, the position is first position, and wherein the step of sensing a temperature of the fluid stream downstream of the first position over time is performed at a second position, the method can further include sensing a temperature of the fluid stream at a third position that is downstream of the second position temperature profiles obtained at the second and third positions can be compared, this comparison can be used to identify a phase of the fluid being sensed at the second and third positions.

Another example of a method of evaluating flow of a fluid downhole includes applying thermal energy to the flow of fluid at a position in the flow of fluid, sensing a temperature of the fluid stream downstream of the position over time at a first downstream location, sensing a temperature of the fluid stream downstream of the position over time at a second downstream location that is downstream of the first downstream location, and estimating a type of fluid in the (low of fluid based on a comparison of temperature profiles obtained by sensing temperatures at the first and second downstream locations. In one example, the method further includes estimating fluid flow based on a measurement of a time lapse between when the thermal energy is applied to the fluid, and when a peak of temperature is observed at the first downstream location, the method also optionally further involves repeating the steps of applying thermal energy and sensing temperature of the fluid stream al radial positions in the flow of fluid. The method optionally further includes identifying different phases of fluid within the flow of fluid.

Also disclosed herein is a system for evaluating fluid flow in a downhole wellbore, and which includes, a thermal source module that is selectively disposed in a flow of fluid in the wellbore and energized to apply thermal energy to the flow of fluid, a thermal sensor module disposed axially away from the thermal source module and disposed in the flow of the fluid in the wellbore downstream of the thermal source module, and that selectively monitors a temperature profile of the fluid over time, and a controller in communication with the thermal sensor module and that selectively identifies a phase of fluid in the (low of fluid based on an analysis of the temperature profile monitored by the thermal sensor module. The thermal sensor module can be a first thermal sensor module, the system further having a second thermal sensor module disposed downstream of the first thermal sensor module and that selectively monitors a temperature profile of the fluid over time. In an example, the controller is in communication with the second thermal sensor module. The system can also include an elongate frame to which the thermal source module and the sensor modules are coupled, and an arm having a length, a width, and a height, and a slot formed radially through the arm, and wherein the frame is coupled in the slot and pivotable about a line that projects along the height of the arm. In an embodiment, the arm mounts to a housing and is pivotal between an orientation substantially parallel with a length of the housing and to an orientation oblique to the length of the housing and that spans across a substantial portion of a diameter of the wellbore. The system can further include an arm having a plurality of thermal source modules each having a corresponding thermal sensor module disposed downstream and each along paths that intersect the thermal source modules and are substantially parallel with an axis of the wellbore.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Figure 1:
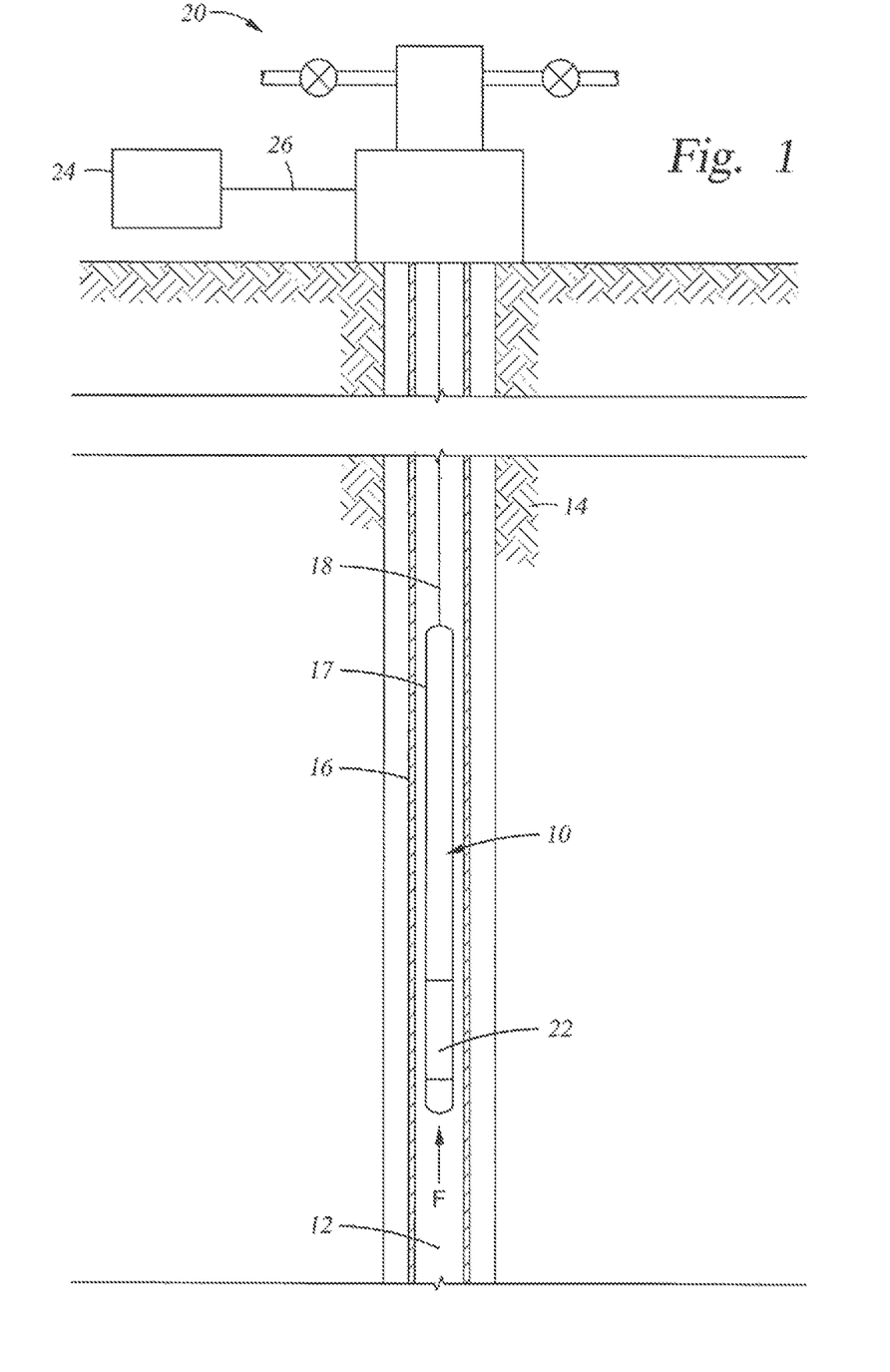
FIG. 1 is a side partial sectional view of an embodiment of a downhole tool having a fluid sensor assembly and disposed in a wellbore.

FIG. 1 is a side partial sectional view of an example of a downhole tool 10 disposed in a wellbore 12. In this example, wellbore 12 intersects a formation 14 which includes hydrocarbons that are being produced through wellbore 12. Production tubing 16 is shown inserted within wellbore 12 and which may be coaxially disposed within casing (not shown) cemented within wellbore 12. Downhole tool 10 includes a housing 17 shown suspended on wireline 18, where wireline 18 is supported by a wellhead assembly 20 on its upper end. Included in housing 17 is a fluid sensor assembly 22 for monitoring and/or analyzing a flow of fluid F shown flowing within production tubing 16 towards wellhead assembly 20 and over housing 17. A controller 24 is shown above surface and which is in communication with downhole tool 10 and fluid sensor assembly 22 via a communication means 26. Examples exist wherein controller 24 is provided within an operations vehicle (not shown) on surface and above the opening of the wellbore 12. Although communication means 26 is illustrated as being hardwired, other embodiments exist for communication means 26 such as wireless, fiber optic, and any other form of transmitting and/or receiving signals.

Figure 2:
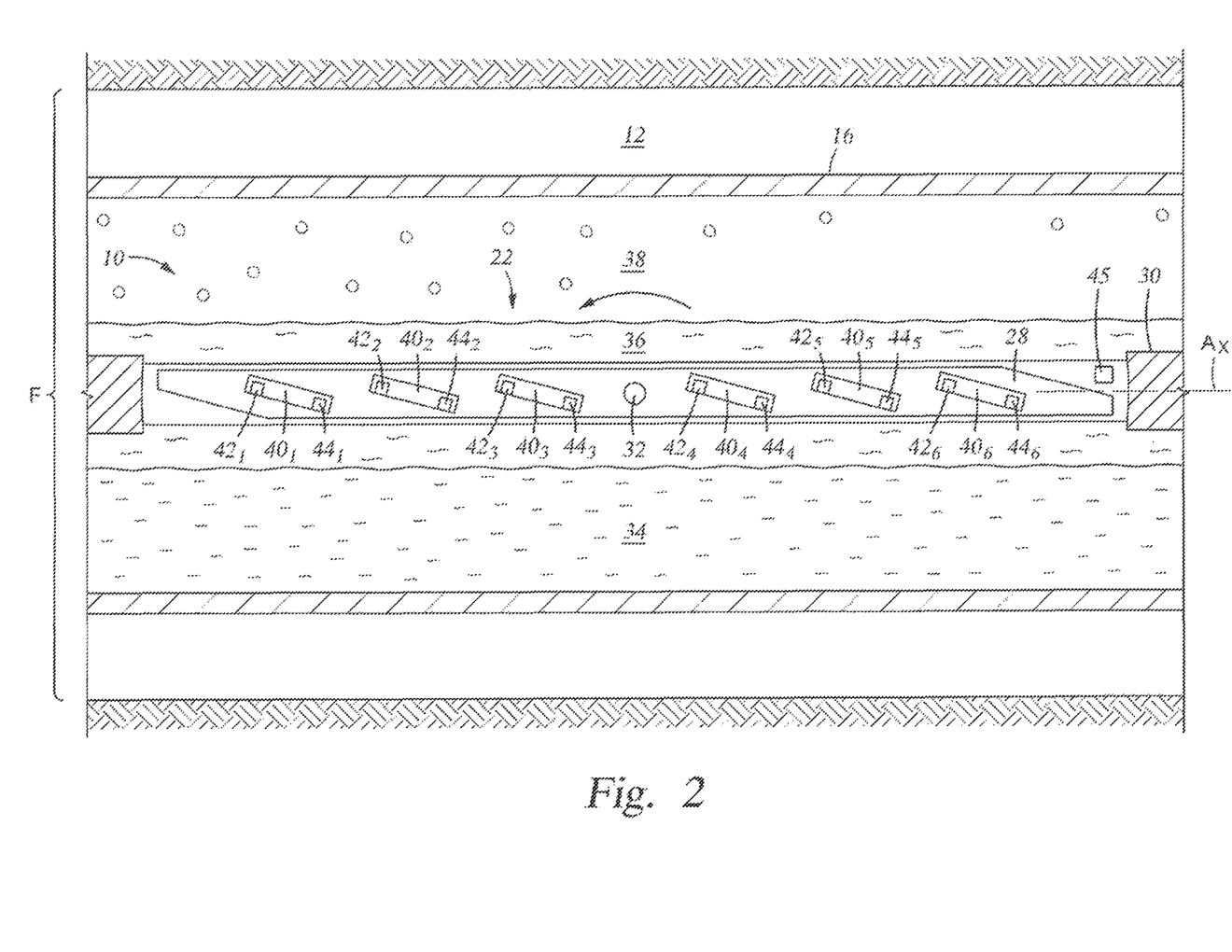
FIGS. 2 and 3 are side views of an embodiment of the fluid sensor assembly of FIG. 1 disposed in a deviated portion of production tubing.

FIG. 2 shows in a side sectional view an example of a segment of downhole tool 10 disposed in a length of tubing 16 that resides in a deviated portion of wellbore 12. In this example fluid sensor assembly 22 includes an elongate arm 28 that couples to an extension 30 shown depending downward from housing 17 (FIG. 1). In this embodiment, arm 28 selectively rotates with respect to extension 30 about a pin 32 that pivotingly couples arm 28 to extension 30. In this deviated portion of well bore 12, fluid V is made up of different types of fluid that are in multiple phases. More specifically, a water layer 34 is shown in a lower portion of fluid F adjacent a lower section of tubing 16, and a liquid hydrocarbon layer 36 is shown disposed above water layer 34 in a mid-portion of tubing 16. In the space above liquid hydrocarbon layer 36 is a gas layer 38, that occupies the space between an upper border of liquid hydrocarbon layer 36 and the upper inner surface of tubing 16. A series of elongate slots $40_{1-6}$ are shown formed laterally through the arm 28. Each of the slots $40_{1-6}$ includes a thermal source module $42_{1-6}$, which in one example of operation transmits thermal energy into fluid F flowing in tubing 16 and past wellbore tool 10. Also disposed within each of the slots $40_{1-6}$ are thermal sensor modules $44_{1-6}$ that monitor temperature within the flow of fluid F. In an example, the thermal source modules $42_{1-6}$ are heating elements, such as elongate wires, across which current is conducted to generate thermal energy, which is then transferred into the fluid F flowing past the thermal source modules $42_{1-6}$. In an embodiment, the thermal sensor modules $44_{1-6}$ are thermocouples and when exposed to a (low of the fluid F, emit signals representative of temperature within the fluid F flowing past the thermal sensor modules $44_{1-6}$, wherein the signals can be correlated to an actual temperature of the fluid F so the temperature of the fluid F can be monitored.

Figure 3:
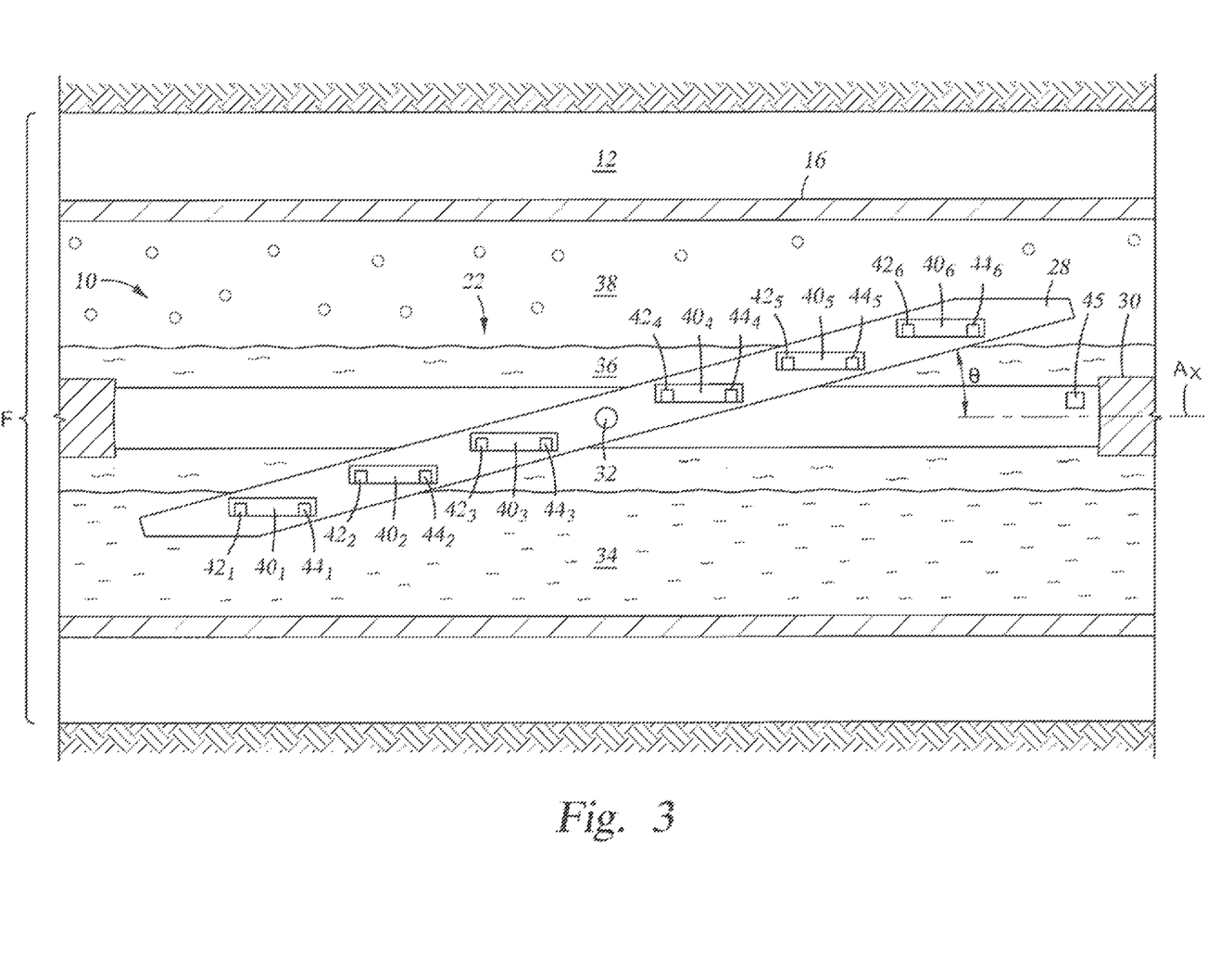

FIG. 3 illustrates an example of operation wherein arm 28 is no longer substantially parallel with axis $A_X$ of tubing 16, but instead has been rotated to an orientation that is oblique to axis $A_X$. In this example, at least one of each of the slots $40_{1-6}$ are each of the separate phase layers. More specifically, slot $40_1$ is in the water layer 34 and slot $40_6$ is disposed in the gas layer 38. Each of slots $40_{2-5}$ are in the liquid hydrocarbon layer 36. Alternate embodiments of use exist where an equal number of slots $40_{1-6}$ are disposed in each of the fluid layers 34, 36, 38. i.e. slots $40_{1,2}$ in water layer 34, slots $40_{3,4}$ in liquid hydrocarbon layer 36, and slots $40_{5,6}$ in gas layer 38. In this example, the thermal source modules $42_{1-6}$ are energized to create heating within the fluid F. Moreover, the corresponding thermal sensor modules $44_{1-6}$ are disposed directly downstream of their corresponding thermal source modules $42_{1-6}$ so that the fluid F heated by a one of the modules $42_{1-6}$ is sensed by its corresponding sensor $44_{1-6}$. Accordingly, heating created by the thermal source modules $42_{1-6}$ can be monitored by the respective thermal sensor modules $44_{1-6}$. As will be described in more detail below, analyzing the temperature profile over time of the fluid F can then help identity in which phase of fluid 34, 36, 38 the individual thermal sensor modulus $44_{1-6}$ is disposed. Optionally, a proximity sensor system 45 can be included that provides for measurement of the angular displacement of arm 28 so that the location of each of the slots $40_{1-6}$ can be estimated based on signal output from the proximity sensor 45. In an example, the locution of the slots $40_{1-6}$ can include either how far from the extension 30 is the specific one of the slots $40_{1-6}$, or a value of angle θ of the arm 28 with respect to the extension 30. Thus, the ability to ascertain the phase of fluid F based on temperature readings from the sensor modules $44_{1-6}$, coupled with output from proximity sensor 45, can provide information about the amount of the particular fluid phases 34, 36, 38 disposed within tubing 16.

Figure 4:
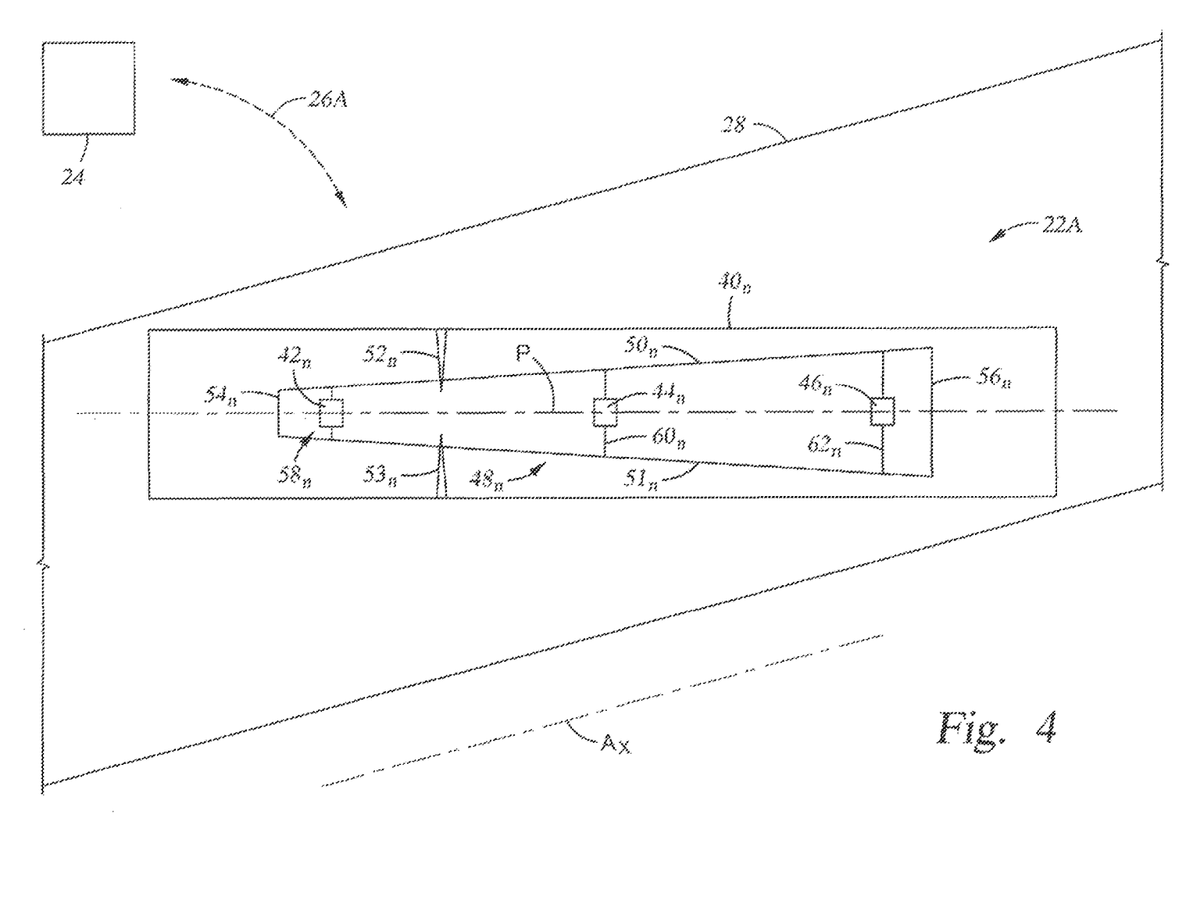
FIG. 4 is a side view of a portion of the fluid sensor assembly of FIG. 1.

Referring now to FIG. 4, shown in a side view is one example of an alternate embodiment of sensor assembly 22A and which includes an aft thermal sensor module $46_n$ disposed downstream of the thermal sensor module $44_n$. In this example, a module frame $48_n$ is provided in slot $40_n$, and on which each of the formal source module $42_n$, thermal sensor module $44_n$, and aft thermal sensor module $46_n$ are coupled. Module frame $48_n$ includes an elongate upper frame member $50_n$ that is shown extending obliquely to a length of slot $40_N$ and a lower frame member $51_n$ that also extends obliquely along a length of slot $40_n$. Upper and lower frame members $50_n$, $51_n$ project along paths that diverge from one another. Pins $52_n$, $53_n$ respectively couple the upper and lower frame members $50_n$, $51_n$ to the edge of the slot $40_n$. Forward ends of the upper and lower frame members $50_n$, $51_n$ are coupled to one another via a forward frame member $54_n$, which is an elongate member and extends generally perpendicular to a length of slot $40_n$. The rearward ends of the upper and lower frame members $50_n$, $51_n$ are coupled to one another by an elongate aft frame member $56_n$, which is generally parallel with forward frame member $54_n$. As the upper and lower frame members $50_n$, $51_n$ diverge from one another along their respective lengths, the all frame member $56_n$ is longer than forward frame member $54_n$. Accordingly, frame $48_n$ has a weather vane type look and with a height that increases along its length, and the pins $52_n$, $53_n$ are closer to the forward frame member $54_n$ than to the art frame member $56_n$. As such, when placed in a flowing stream of fluid, the enlarged aft portion of frame $48_n$ will direct the frame $48_n$ that is in a path substantially parallel with the path of any flow of fluid F flowing past the arm 28. Pins $52_n$, $53_n$ have a pivoting coupling with frame $48_n$ which allows this weather vane type action in the flow of fluid F. Mounting brackets $58_n$, $60_n$, $62_n$ respectively mount the thermal source module $42_n$, thermal sensor module $44_n$, and aft thermal sensor module $46_n$ within frame $48_n$. Accordingly, the modules $42_n$, $44_n$, $46_n$ are each aligned in a path P of any fluid F that flows across arm 28. Thus, the sensor modules $44_n$, $46_n$ are strategically located in path P to detect healing of fluid F introduced by operation of the source module $42_n$. These modules $42_n$, $44_n$, $46_n$ are all in communication with controller 24 via communication means 26A, that in this embodiment is illustrated as a wireless device or system.

Figure 5:
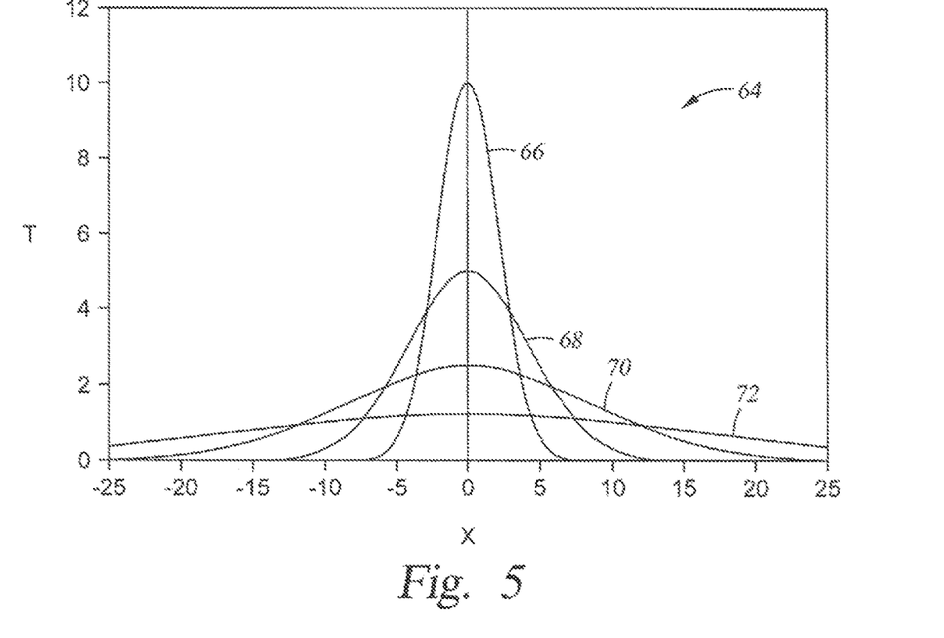
FIG. 5 is a graphical illustration of an example of a temperature profile over time of a stationary fluid after an instantaneous thermal energy pulse.
Figure 6:
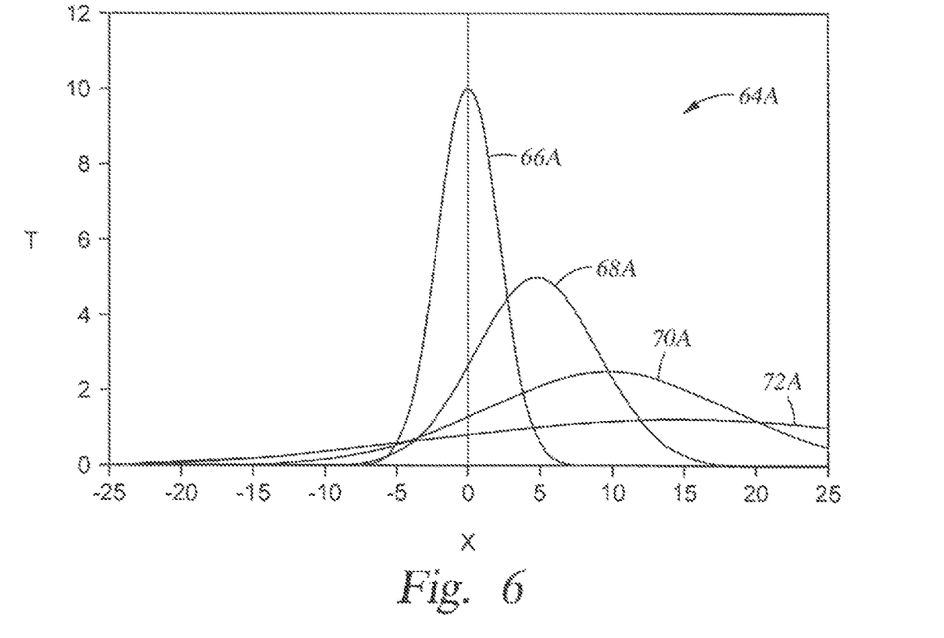
FIG. 6 is a graphical illustration of an example of a temperature profile over time of a moving fluid after an instantaneous thermal energy pulse.
Figure 7:
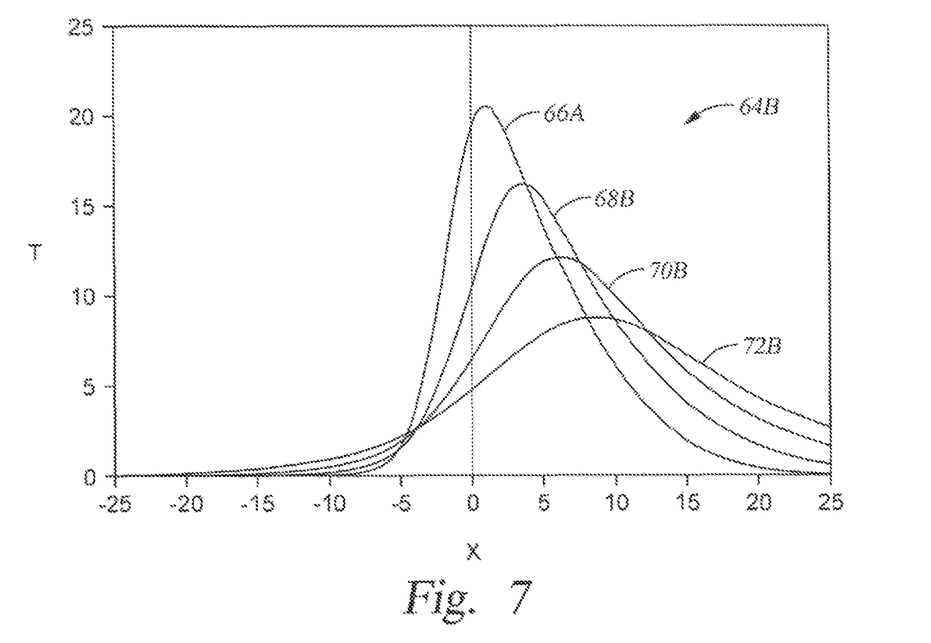
FIG. 7 is a graphical illustration of an example of a temperature profile over time of a moving fluid after a prolonged thermal energy pulse.

FIGS. 5 through 7 graphically illustrate temperature profiles over time in fluids and depict differences between an instantaneous thermal energy pulse versus one that is prolonged. More specifically shown in FIG. 5 is a coordinate system 64 where the abscissa represents axial distance in a body of fluid and the ordinate represents temperature T. Profile 66 represents temperature in the fluid and where the value of X equals zero represents the location where in the fluid a thermal energy input is applied. Temperature profiles 68, 70, 72 show how the temperature changes over time and becomes flatter with a reduced maximum value of temperature T. Each of the profiles 66, 68, 70, 72 follow a Gaussian profile. In the example of FIG. 5, the fluid F in which the thermal energy impulse is applied is generally stationary.

FIG. 6 illustrates one example of introducing a thermal energy impulse into a flowing body of fluid. In this example, the thermal energy input is a pulse which may last up to a few milliseconds. Shown plotted on coordinate system 64A are temperature profiles taken over time. i.e., 66A, 68A, 70A, 72A. More specifically, profiles 68A, 70A, 72A, which represent temperature distribution at t=0+, have corresponding peaks that move along the abscissa and in the direction of fluid flow. Moreover, as can be seen, the profiles 68A, 70A, 72A all have respective peaks that diminish over time and are less than the peak of profile 66A. Similarly, FIG. 7 illustrates coordinate system 64B on which are plotted a series of profiles 66B, 68B, 70B, 72B, wherein the thermal energy input is applied not as a pulse, but over a period of time, such as one that may exceed a few hundred milliseconds. In this example, the Gaussian distribution resembles that of a sum of individual Gaussian profiles.

Figure 8:
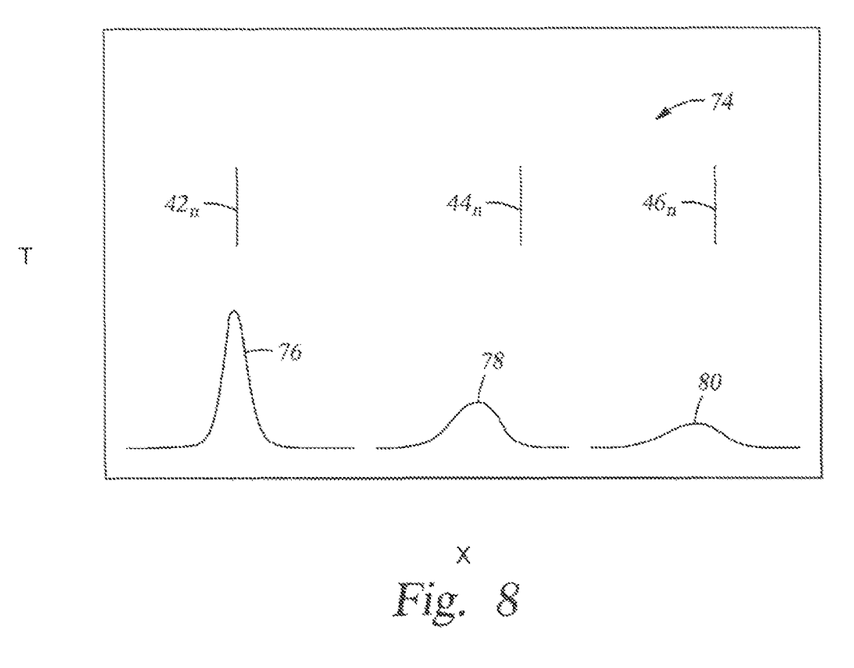
FIG. 8 is a graphical illustration of an example of fluid temperature profiles at where thermal energy is applied to the fluid, and downstream at a temperature sensor.

FIG. 8 represents one example of a temperature profile 76, 78, 80 that may be recorded respectively at the thermal source module $42_n$, thermal sensor module $44_n$, and aft thermal sensor 46$_n$. An advantage of multiple sensor modules $44_n$, $46_n$ is that additional data may be recorded that illustrates the respective profiles 78, 80 and provides information about how quickly the temperature dissipates. Thus, studying either or both of temperature profile 78, 80, in comparison to temperature profile 76, not only can the velocity of the fluid flowing past the modules $42_n$, $44_n$, $46_n$ be estimated, so may the type of fluid that flows past the sensor modules $44_n$, $46_n$. For example, the rate at which the thermal energy making up the temperature profiles dissipates can be estimated and used to identify the particular type of fluid. It is known that the Gaussian profile will become flatter in water over a time period less than that for liquid hydrocarbon. Thus, comparing the measured temperature profile and comparing that to a known temperature profile for either water or liquid hydrocarbon, the corresponding fluid being monitored may be identified.

EXAMPLE

Table 1 below illustrates values of thermal conductivity, density, heat capacity, density*heat capacity, thermal diffusivity, and diffusivity ratio for crude oil, water, and methane over a range of temperature and pressure conditions.

TABLE 1

| | Thermal Conductivity k [Wm$^{-3}$K$^{-1}$] | Density ρ [kg/m$^3$] | Heat Capacity c$_p$ [jkg$^{-1}$K$^{-1}$] | Density * Heat Capacity ρ [kg/m$^3$] * c$_p$ [jkg$^{-1}$K$^{-1}$] | k/(ρ ∈ γ) Thermal Diffusivity, α [m$^{-2}$sec$^{-2}$] | Diffusivity Ratio α/α$_{CRUDE}$ |
|---|---|---|---|---|---|---|
| Crude Oil | 0.125 | 850 | 1800 | 1530000 | 8.16993E−08 | 1.000 |
| Water | 0.580 | 1000 | 4180 | 4180000 | 1.38756E−07 | 1.698 |
| Methane (125 C., 8000 psi) | 0.098 | 213 | 3299 | 702094 | 1.40010E−07 | 1.714 |
| Methane (150 C., 8000 psi) | 0.101 | 200 | 3293 | 659331 | 1.53754E−07 | 1.882 |
| Methane (175 C., 8000 psi) | 0.099 | 189 | 3306 | 623926 | 1.58477E−07 | 1.940 |

TABLE 1-continued

| | Thermal Conductivity k [Wm$^{-3}$K$^{-1}$] | Density ρ [kg/m$^3$] | Heat Capacity c$_p$ [jkg$^{-1}$K$^{-1}$] | Density * Heat Capacity ρ [kg/m$^3$] * c$_p$ [jkg$^{-1}$K$^{-1}$] | k/(ρ ∈ γ) Thermal Diffusivity, α [m$^{-2}$sec$^{-2}$] | Diffusivity Ratio α/α$_{CRUDE}$ |
|---|---|---|---|---|---|---|
| Methane (125 C., 5000 psi) | 0.088 | 178 | 3294 | 586891 | 1.49757E−07 | 1.833 |
| Methane (150 C., 5000 psi) | 0.084 | 145 | 3246 | 469050 | 1.78149E−07 | 2.181 |
| Methane (175 C., 5000 psi) | 0.085 | 135 | 3243 | 436633 | 1.95640E−07 | 2.395 |
| Methane (125 C., 10000 psi) | 0.108 | 240 | 3279 | 786721 | 1.37346E−07 | 1.681 |
| Methane (150 C., 10000 psi) | 0.107 | 227 | 3290 | 747057 | 1.43455E−07 | 1.756 |
| Methane (175 C., 10000 psi) | 0.107 | 216 | 3311 | 713622 | 1.50273E−07 | 1.839 |

Additionally, in combination with providing multiple sets of the modules $42_{1-6}$, $44_{1-6}$, $46_{1-6}$ at multiple radial locations within the bore hole (FIG. 3), the location at the interface of multiple phase fluids can also be identified. More specifically, in a deviated wellbore, it will be known that the uppermost portion of the tubing will contain a gas, so that in situations when the temperature profile of gas is similar to that of water, the spatial location of where the temperature profile is being measured can provide an indication of whether or not the fluid is water or gas. Velocity can be obtained if the time between the thermal energy input and when that thermal energy is detected by the sensor modules $44_n$, $46_n$ in combination with the respective distances between the modules $42_n$, $44_n$, $46_n$ are known. It should be pointed out, that although the profiles in FIG. 7 might appear to emulate a distorted Gaussian, the respective peak movement can still be used to obtain flow velocity of the fluid. An advantage of using a line source for the thermal energy input, i.e., a thin resistively heated wire, is so that the system can be modeled as a one-dimensional problem. One reason why the temperature profile in water is flatter is that water has higher thermal diffusivity than oil. Thermal diffusivity is typically defined as thermal conductivity divided by the product of mass density and heat capacity. Therefore, for the same flow rate, the fluid temperature profile after pulse heating becomes wider and shorter quicker for water than it does for oil. To visualize this phenomenon, imagine being in the frame of reference of the fluid (by traveling alongside it at the same speed) with a thermal imaging camera and seeing the injected thermal pulse diffusing left and right of where it had been injected much more quickly for water than it would for oil because water has approximately 1.7 times the thermal diffusivity of oil. In this example, in the frame of reference of the tool, the measured temporal thermal profile is compressed in time because of the relative motion between the moving fluid and the temperature sensors that are attached to the stationary tool. Because in many downhole conditions the natural gas is at a high pressure and temperature, it can have a thermal diffusivity comparable to that of water, which is why the actual radial locations of the sensor modules $44_n$, $46_n$ in relationship to the directions of up and down may be required in order to differentiate the type of fluid being monitored by these modules $44_n$, $46_n$. That is, in laminar flow, gas will be on top, oil in the middle, and water on the bottom, providing an additional way to distinguish fluid types when thermal diffusivities are comparable.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of evaluating stratified flow of a fluid downhole comprising:
   a. applying thermal energy to the flow of fluid at a position in the flow of fluid;
   b. sensing a temperature of the fluid stream downstream of the position over time to obtain a temperature profile of the fluid;
   c. estimating a thermal diffusivity of the fluid based on the temperature profile; and
   d. estimating a type of fluid in the flow of fluid based on the step of estimating thermal diffusivity.

2. The method of claim 1, wherein the position and where the temperature of the fluid stream is sensed downstream are at the same radial distance from an axis of the flow of fluid.

3. The method of claim 1, wherein the steps of applying thermal energy to the flow of fluid is performed at different radial positions in the flow of fluid, and temperatures downstream of the different radial positions are sensed.

4. The method of claim 3, further comprising generating a temperature profile of fluid at each of the different radial position, and identifying different phases of fluid within the flow of fluid at the different radial position based on the step of generating the temperature profiles.

5. The method of claim 4, wherein the different phases of fluid comprise water, liquid hydrocarbon, and gas.

6. The method of claim 3, wherein the thermal energy is applied upstream and spaced axially away from where the temperature is sensed at each radial position.

7. The method of claim 1, further comprising estimating a flow rate of the flow of fluid based on an elapsed time between when the thermal energy is applied and when a peak temperature is measured downstream.

8. The method of claim 1, wherein the position comprises first position, and wherein the step of sensing a temperature of the fluid stream downstream of the first position over time is performed at a second position, the method further comprising sensing a temperature of the fluid stream at a third position that is downstream of the second position.

9. The method of claim 8, further comprising comparing temperature profiles obtained at the second and third positions, and using the comparison to identify a phase of the fluid being sensed at the second and third positions.

10. A method of evaluating stratified flow of a fluid downhole comprising:
   a. applying thermal energy to the flow of fluid at a position in the flow of fluid;
   b. obtaining a first temperature profile of a fluid in the flow of fluid by sensing a temperature of the fluid in the flow of fluid downstream of the position over time at a first downstream location;

c. obtaining a second temperature profile of the fluid in the flow of fluid by sensing a temperature of the fluid in the flow of fluid downstream of the position over time at a second downstream location that is downstream of the first downstream location;

d. estimating a thermal diffusivity of the fluid based on the first and second temperature profiles; and e. estimating a type of fluid in the flow of fluid based on a comparison of temperature profiles obtained by sensing temperatures at the first and second downstream locations.

11. The method of claim 10, further comprising estimating fluid flow based on a measurement of a time lapse between when the thermal energy is applied to the fluid, and when a peak of temperature is observed at the first downstream location.

12. The method of claim 10, further comprising repeating the steps of applying thermal energy and sensing temperature of the fluid stream at radial positions in the flow of fluid.

13. The method of claim 12, further comprising identifying different phases of fluid within the flow of fluid.

14. A system for evaluating stratified fluid flow in a downhole wellbore comprising:

sets of modules that are selectively disposed at different radial locations in the wellbore, each set of modules comprising,
  a thermal source module that is selectively disposed in a flow of fluid in the wellbore and energized to apply thermal energy to the flow of fluid;
  a thermal sensor module disposed axially away from the thermal source module and strategically located at substantially the same radial position as the thermal source module in the flow of the fluid in the wellbore, and downstream of the thermal source module to detect thermal energy applied to the flow of fluid by the thermal source module, and that selectively monitors a temperature profile of the fluid over time; and a controller in communication with each of the thermal sensor modules and that selectively identifies a phase of fluid in the flow of fluid based on an analysis of the temperature profile monitored by the thermal sensor modules.

15. The system of claim 14, wherein the thermal sensor module comprises a first thermal sensor module, the system further comprising a second thermal sensor module disposed downstream of the first thermal sensor module and that selectively monitors a temperature profile of the fluid over time.

16. The system of claim 15, wherein the controller is in communication with the second thermal sensor module.

17. The system of claim 15, further comprising, an elongate frame to which the thermal source module and the sensor modules are coupled, and an arm having a length, a width, and a height, and a slot formed through the width of the arm, and wherein the frame is coupled in the slot and pivotable about a line that projects along the height of the arm.

18. The system of claim 17, wherein the arm mounts to a housing and is pivotal between an orientation substantially parallel with a length of the housing and to an orientation oblique to the length of the housing and that spans across a substantial portion of a diameter of the wellbore.

19. The system of claim 14, further comprising an arm having a mid-section, the arm being selectively pivoted about the mid-section to an orientation oblique to an axis of the wellbore and spanning substantially across the wellbore, and wherein the sets of modules are spaced apart along the arm, and wherein some of the sets of modules are disposed on a side of the housing opposite from remaining sets of modules when the arm is oblique to the length of the housing.

* * * * *